United States Patent
Bruck et al.

(10) Patent No.: US 7,188,904 B2
(45) Date of Patent: Mar. 13, 2007

(54) LEAD SCREW AND GEAR BOX FOR USE WITH A MOTORIZED ADJUSTABLE SEAT BACK AND EXHIBITING A NUT AND NYLON SPACER BUSHING IN ABUTTING ENGAGEMENT WITH A SLOTTED CATCHER BRACKET FOR PREVENTING END-PLAY OF THE LEAD SCREW AS WELL AS BUZZ, SQUEAK AND RATTLE IN TENSILE AND COMPRESSIVE LOADING SITUATIONS

(75) Inventors: Stephen Bruck, Howell, MI (US); Jeffrey A. Gabalski, West Bloomfield, MI (US)

(73) Assignee: BAE Industries, Inc., Centerline, MI (US)

( * ) Notice: Subject to any disclaimer, the term of this patent is extended or adjusted under 35 U.S.C. 154(b) by 581 days.

(21) Appl. No.: 10/769,354

(22) Filed: Jan. 30, 2004

(65) Prior Publication Data

US 2005/0179296 A1    Aug. 18, 2005

(51) Int. Cl.
*B60N 2/23*    (2006.01)
(52) U.S. Cl. ............... 297/362.14; 297/362.11
(58) Field of Classification Search ............... 297/330, 297/361.1, 362.11, 362.14
See application file for complete search history.

(56) References Cited

U.S. PATENT DOCUMENTS

| | | | | |
|---|---|---|---|---|
| 3,617,021 A | | 11/1971 | Littmann | 248/393 |
| 4,538,855 A | | 9/1985 | Peetz | 297/362 |
| 4,802,374 A | | 2/1989 | Hamelin | 74/89.14 |
| 5,172,601 A | | 12/1992 | Siegrist | 74/89.15 |
| 5,203,608 A | | 4/1993 | Tame | 297/320 |
| 5,280,999 A | * | 1/1994 | Jones et al. | 297/361.1 |
| 5,349,878 A | | 9/1994 | White | 74/89.14 |
| 5,462,332 A | | 10/1995 | Payne | 297/216.1 |
| 5,575,531 A | | 11/1996 | Gauger | 297/362.11 |
| 5,597,205 A | * | 1/1997 | Glance et al. | 297/362.14 |
| 5,611,747 A | | 3/1997 | Bauer | 475/162 |
| 5,871,195 A | | 2/1999 | Gauger | 248/419 |
| 5,884,970 A | * | 3/1999 | Howard | 297/362.14 |
| 6,260,922 B1 | | 7/2001 | Frohnhaus | 297/330 |

(Continued)

*Primary Examiner*—Anthony D. Barfield
(74) *Attorney, Agent, or Firm*—Gifford, Krass, Groh, Sprinkle, Anderson & Citkowski, P.C.

(57) ABSTRACT

A powered seat assembly for reducing end-play of an associated lead screw interconnecting a pivotally secured seat back to a motor gear box. A motor actuates the lead screw through an input to the motor gear box and in order to pivotally readjust the seat back. The seat assembly includes a base plate, the seat back pivotally securing to a forward location of the base plate, the motor gear box securing to a rearward location. A bracket secures to an intermediate location of the base plate, a slot defined in an extending portion of the bracket defining a passage therethrough for the lead screw. A spacer bushing is supported upon the lead screw and adheres against a face of the bracket opposite the pivotally secured seat back. The spacer bushing absorbs tensile loading forces applied axially along the lead screw and in a direction towards the seat back in order to prevent movement of the lead screw in and out of the motor gear box as well as preventing the occurrence of buzz, squeak and rattle noises accompanied by metal-to-metal contact within the assembly.

13 Claims, 2 Drawing Sheets

U.S. PATENT DOCUMENTS

| | | | |
|---|---|---|---|
| 6,293,723 B1 | 9/2001 | Kiefer | 403/21 |
| 6,322,146 B1 | 11/2001 | Fisher, Jr. | 297/362.14 |
| 6,464,421 B1 | 10/2002 | Kiefer | 403/21 |
| 2003/0173809 A1 | 9/2003 | Moradell | 297/344.1 |

* cited by examiner

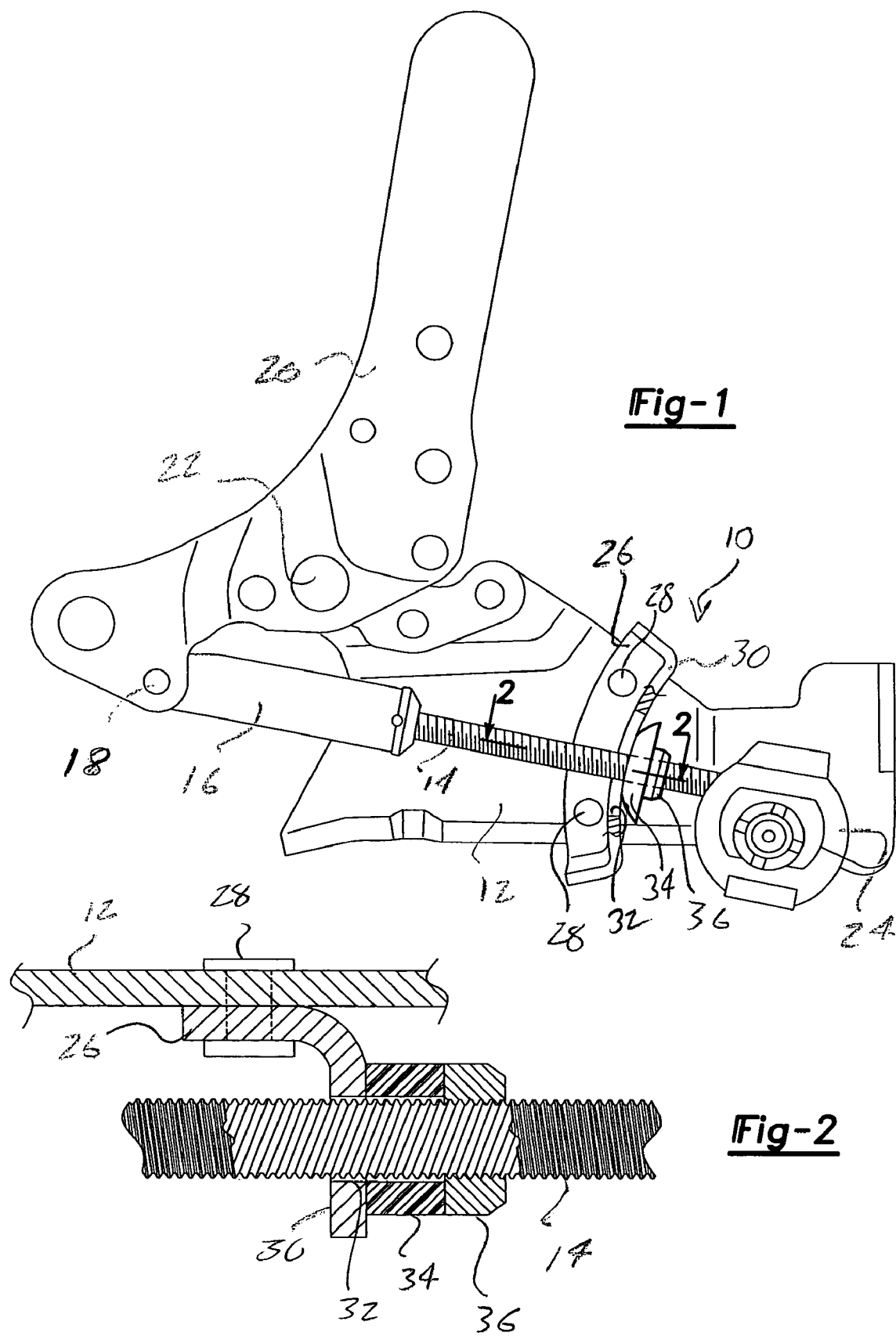

LEAD SCREW AND GEAR BOX FOR USE WITH A MOTORIZED ADJUSTABLE SEAT BACK AND EXHIBITING A NUT AND NYLON SPACER BUSHING IN ABUTTING ENGAGEMENT WITH A SLOTTED CATCHER BRACKET FOR PREVENTING END-PLAY OF THE LEAD SCREW AS WELL AS BUZZ, SQUEAK AND RATTLE IN TENSILE AND COMPRESSIVE LOADING SITUATIONS

BACKGROUND OF THE INVENTION

1. Field of the Invention

The present invention relates generally to motorized vehicle seat back adjustment devices, in particular of the type incorporating a lead screw extending between a gear box arrangement and a pivotally associated seat back. More specifically, the present invention incorporates a reinforced and arcuate shaped catcher bracket, through which the lead screw extends, and in combination with an adjustable nut and nylon spacer bushing. The present design operates to relieve buzz, squeak and rattle conditions typically associated with such prior art gearbox arrangements in tensile loading situations and which result from free-play of the lead screw in directions in and out of the gearbox. Additionally, the present design transfers tensile and compressive loads from the gear box to the catcher bracket. This increases the fatigue life of the assembly as well as increase the amount of load the assembly is able to withstand.

2. Description of the Prior Art

The prior art is well documented with various examples of motorized powered seat back mechanisms, such as which in particular are utilized inside of a vehicle. Many such seat assemblies include the provision of a threaded lead screw and which interconnects a pivotally associated seat back with a power supplying gearbox arrangement.

A common problem encountered in such existing seatback arrangements is the existence of free-play movement (also known as endplay) of the lead screw in directions in and out of the gearbox, this directly contributing to an increase in arm looseness and deflection. In particular, the gearbox arrangement includes the provision of a plastic worm gear, seating about a periphery of the lead screw at its inserting end, and in contact with a metal drive shaft associated with an electric motor input. Free play movement of the lead screw typically results from the failure of the assembly to maintain either a separation or a constant contact between an inserted end face of the lead screw and a base abutment surface associated with the gearbox.

Other examples of prior art powered vehicle seat adjusters include such as that illustrated in U.S. Pat. No. 5,575,531, issued to Gauger et al., and which teaches a rotatable drive shaft with first and second axial ends and an intermediate arcuate portion connecting the first and second axial ends. The first and second axial ends are respectively axially connected to a drive motor gear assembly and to a driven lead screw. A horizontal drive block threadingly engaging the lead screw is rotatably and vertically translatingly mounted in an aperture in a lower track for self-alignment of the drive block with respect to the lead screw.

A housing rotatably receives the axial connection between one end of the drive shaft and the lead screw. The bearing block is rotatably and translatingly mounted in a bracket fixed to an upper track for self-alignment of the drive shaft with the lead screw. A rivet block engages the lead screw and is mounted for rotation and translation in a link. The upper and lower tracks have a guide section and an abutment section which collapse together in a self-cinching action under force loading to resist separation of the upper and lower tracks.

U.S. Pat. No. 5,203,608, issued to Tame, teaches a seat assembly with an articulating seat cushion rotatable about a transverse axis near the front end of the seat cushion. The seat back is reclinable and is coupled to the rear of the seat cushion so as to raise the rear end of the seat cushion in response to rearward reclining of the seat back, whereby the seat occupant's hip point is raised as the seat back is reclined to provide a more comfortable recliner. The recliner drive mechanism includes a lead screw with a motor/transmission assembly to drive the lead screw and includes a thrust washer carried by the lead screw to transfer axial loads on the lead screw directly to the motor mount rather than allowing the lead screw to be transferred to the internal components of the motor/transmission assembly.

U.S. Pat. No. 6,322,146, issued to Fisher, Jr., teaches a seat recliner which controllably adjusts the angular position of a seat back relative to a seat base structure and is responsive to remote actuation by an operator. The recliner includes a driven mechanism adapted to be connected to the seat back, a drive mechanism rotatable in a first and second direction, and a transmission assembly operably interconnecting the drive mechanism and the driven mechanism. The transmission assembly includes a gear retainer assembly and a mounting assembly. The mounting assembly is adapted to be connected to one of the seat base and seat back. The gear retainer assembly includes a gear housing formed of a polymeric material and adapted to accommodate the drive and driven mechanisms for operative interconnection, whereby rotation of a transmission rod in the first or second direction causes a recliner rod to move relative to the housing in a corresponding first and second linear direction.

SUMMARY OF THE PRESENT INVENTION

The present invention is a motorized vehicle seat back adjustment device incorporating a lead screw extending between a gear box arrangement and a pivotally associated seat back, and. which in particular includes a reinforced and arcuate shaped catcher bracket combined with an adjustable nut and nylon spacer bushing. As stated previously, the present design operates to relieve buzz, squeak and rattle conditions typically associated with such prior art gearbox arrangements and in addition to free-play (or end-play) of the lead screw in directions in and out of the gearbox. Additionally, the present design transfers tensile and compressive loads from the gear box to the catcher bracket. This increases the fatigue life of the assembly as well as increase the amount of load the assembly is able to withstand.

A motor actuates the lead screw through an input to the motor gear box and in order to pivotally readjust the seat back. The seat back is pivotally secured to a forward location of the base plate, whereas the motor gear box secures to a rearwardly disposed support portion of the base plate.

A component secured to a face of the base plate includes an extending bracket portion, located proximate an intermediate location of said base plate. A slot is defined in the extending portion and defining a passage therethrough for the lead screw. A further variant of the present invention combines the slotted bracket portion and motor gearbox support into a single component attachable to the base plate.

A spacer bushing is supported upon the lead screw and in adhering fashion against a face of the bracket opposite the pivotally secured seat back. The spacer bushing is constructed of a plasticized synthetic material and exhibits an arcuate shaped contact surface relative to the bracket and extending slot. An advantage of constructing the spacer bushing of a nylon material is that it avoids metal to metal contact, relative to the slotted bracket portion, and thereby to avoid buzz, squeak and rattle conditions attendant to such metal to metal contact. A nut is threadably engaged against an opposite facing surface of the spacer bushing and so that the bushing absorbs tensile and compressive loading forces applied axially along the lead screw and in a direction towards the seat back to prevent end-play movement of the lead screw in an out of the motor gear box.

Additional variants include reconfiguring the spacer bushing as a two-piece assembleable nut, such as in particular a Nylok nut and which is assembleable from opposite sides of the lead screw supporting bracket. The slot associated with the bracket, and through which the lead screw extends, exhibits an end-most and enlarged portion for permitting assembly of the two-piece nut.

BRIEF DESCRIPTION OF THE DRAWINGS

Reference will now be made to the attached drawings, when read in combination with the following detailed description, wherein like reference numerals refer to like parts throughout the several views, and in which:

FIG. 1 is a side view of a motorized seatback arrangement and illustrating the arcuate configured catcher bracket, secured to the seat back base plate, and in combination with the nylon spacer bushing and supporting nut according to a first preferred embodiment of the present invention;

FIG. 2 is a cutaway illustration taken along line 2—2 of FIG. 1 and showing from another perspective the abutting engagement of the nylon spacer element against metal surface of the spacer bracket;

DETAILED DESCRIPTION OF THE PREFERRED EMBODIMENTS

Figure 3:
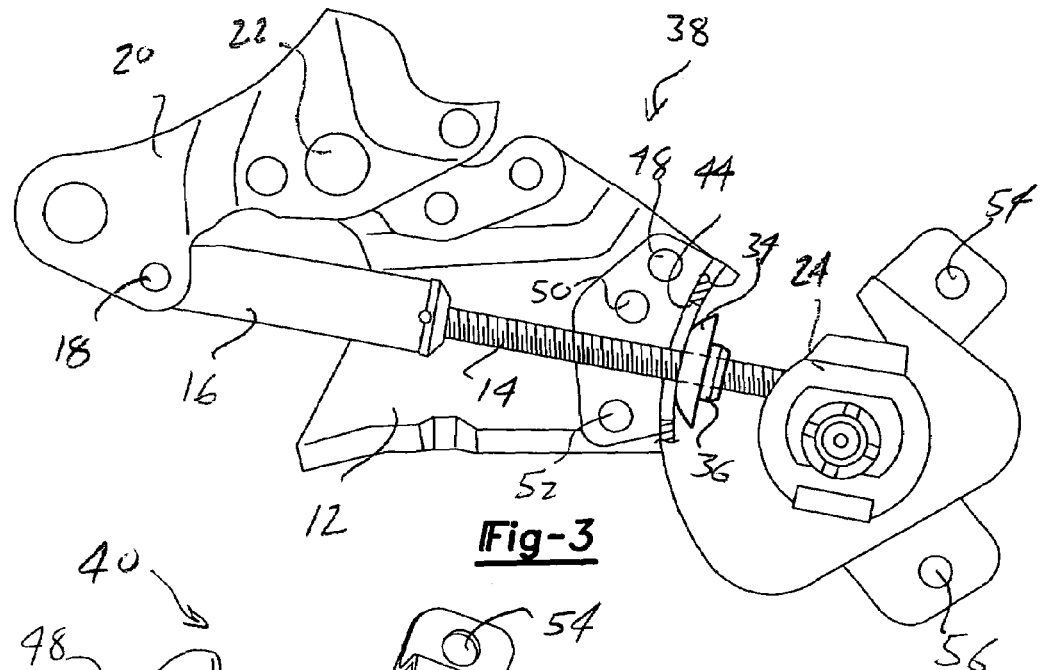
FIG. 3 is a side view of a motorized seatback arrangement according to a second preferred embodiment of the present invention and by which the arcuate catcher bracket and motor support bracket are combined into a single frame component.

Referring now to FIG. 1, a motorized vehicle seat back adjustment device is illustrated at 10 according to a first preferred embodiment of the present invention. In particular, and as previously argued, the present invention incorporates an improved tensile and compressive loading arrangement for relieving buzz, squeak and rattle conditions associated with end play movement of a lead screw relative to an attached electric motor gearbox arrangement.

A single seat adjustment assembly is illustrated at 10 in FIG. 1, it being understood that a pair of such assemblies may be located on either of first and second sides of a vehicle seat (not shown). As best illustrated in FIG. 1, the seat assembly includes a base plate 12 having a specified shape and exhibiting a substantially planar surface. An elongated and externally threaded lead screw is illustrated at 14 and includes a first end secured within a hollow tubular portion 16 (see FIG. 1) in turn pivotally associated, at 18, with a seat back 20. A main pivot 22 is established about which the seat back 20 pivots relative to the base plate 12. In one preferred variant, the seat back 20 is capable of rotating approximately 109° relative to the seat bottom (or base plate 12).

A second end of the lead screw 14 is in turn seated within a motor gear box 24, which is in turn secured to a rear end location of the base plate 12. The motor gear box 24 is typically constructed of a plastic material and seats the inserting end of the lead screw 14 by virtue of an interengaging worm gear (not shown). An output drive shaft associated with an electric motor, also not shown, engages the motor gear box to actuate the lead screw in first and second threadably rotated/axially translated directions and in order to pivot the seat back 20 about the main pivot 22.

A reinforced and arcuate shaped catcher bracket is illustrated at 26 and secures to a surface of the base plate 12 at an intermediate location between the first and second ends of the lead screw 14. The catcher bracket 26 is secured to the base plate 12, such as by rivets 28 or the like, and includes an arcuate extending portion 30. A lengthwise extending slot 32 is defined in the arcuate extending portion 30, see again FIG. 1, and facilitates the traversing motion of the screw 14 relative to the gearbox 24 further such that the lead screw 14 extends through the slot 32.

A spacer bushing is illustrated at 34 and such as more specifically is provided as a nylon or other synthetic material to contrast with the metal construction of the spacer bracket 26. The spacer bushing 34 is illustrated in FIG. 1 as exhibiting a substantially saucer or arcuate shape and, in combination with a threaded nut 36 secured against an opposite face of the bushing 34, abuts against the arcuate extending portion 30 proximate to the perimeter edges defined about the slot 32.

A problem with existing gearbox and lead screw arrangements has to do with the material inconsistencies between the metal screw and the plastic components associated with the gearbox. In particular, the interconnection between the inserting end of the lead screw 14 and the plastic worm gear component in the motor gear box interior is facilitated by various over-molding processes.

The lead screw 14 by itself exhibits fairly high load capabilities, however this is lowered considerably by the properties associated with the plastic motor gear box 24. It has further been determined that, while fairly strong in compression, tension forces applied to the lead screw 14, relative to the gear box 24 and in a direction towards the seat back 20, cause free-play movement, or end play, between the lead screw 14 and the gearbox 24. This is further a result of the failure to maintain a consistent contact between the inserted end face of the lead screw 14 and the associated seating location of the gear box 24.

As stated previously, the present design operates to relieve conditions typically associated with such prior art gearbox arrangements and which result from free-play movement of the lead screw 14 in directions in and out of the gearbox 24. The provision of the synthetic (nylon) spacer bushing 34 is further such that the tension forces normally imparted by the seat back 20, upon the motor gear box 24, are instead applied between the spacer 34 and the corresponding slotted perimeter edges of the arcuate extending bracket portion 30.

The configuration and arrangement of the spacer 34, with its substantially disk-shape configuration, combined with the arcuate profile of the bracket extending portion 30 (see again FIG. 1) allows for higher rearward torque retention (or tension loading resistance) at the location of the catcher bracket 26, and as opposed to these loads being applied to the gear box 24. A further advantage is derived by the nylon to metal contact between the spacer bushing 34 and the surface of the arcuate extending portion 30, this in turn avoiding the undesirable aspects of buzz, squeak and rattle which would otherwise be associated with metal-to-metal contact, and with the attendant loss in customer perception of quality.

Referring now to FIG. 3, a general illustration is shown at 38 of a powered seat assembly according to a further preferred embodiment of the present invention. The seat assembly 38 includes numerous components also identically disclosed in the first preferred embodiment at 10 in FIGS. 1 and 2, these being identically referenced.

Figure 4:
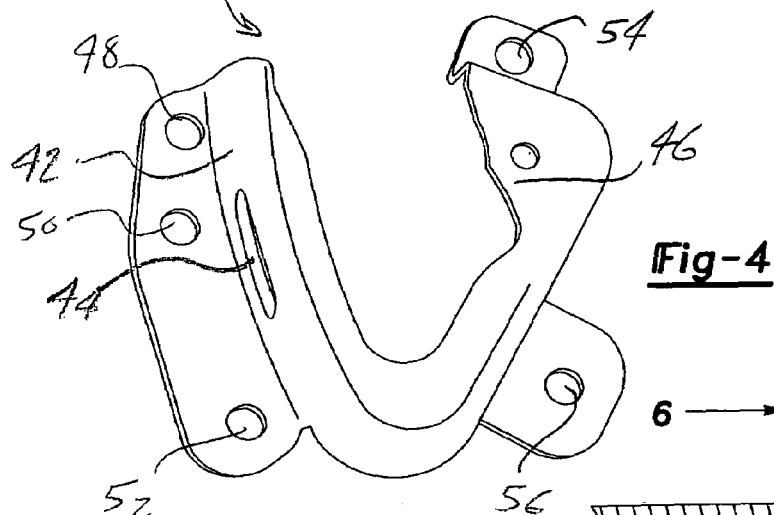
FIG. 4 is a perspective view of the bracket illustrated in the plan view of FIG. 3.

Referring also to FIG. 4, a bracket component 40 is illustrated and which combines the features of a modified bracket portion 42, with slot 44, as well as a further rearward portion 46, at which the motor gear box 24 is installed (see again FIG. 3). The bracket 40 includes additional mounting locations 48, 50 (5), 52, 54 and 56 for securing to the base plate surface 12, as shown in FIG. 3, and in order to substitute for the bracket 26 and gear box 24 to base plate 12 engagement configuration of FIG. 1. Consistent with that shown in FIG. 1, a spacer bushing 34 and backing nut 36 are again secured to the lead screw 14 and abut against an inner facing surface associated with the modified bracket portion 42 of the component 40.

Figure 5:
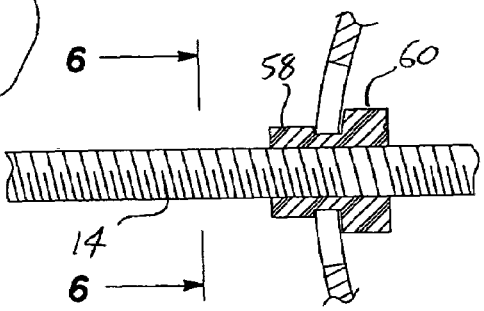
FIG. 5 is a sectional view of an alternate variant of the present invention and by which an alternately configured and two piece assembleable nylon nut is applied to the lead screw and in sliding engagement with an alternately configured catcher bracket.
Figure 6:
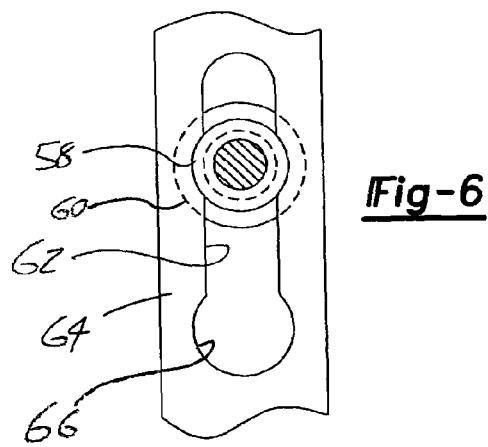
FIG. 6 is a cutaway view taken along line 6—6 of FIG. 5 and showing an end face illustration of a slotted and arcuately configured portion defined within the catcher bracket in FIG. 5.

Referring finally to FIGS. 5 and 6, an alternate arrangement is shown of spacer bushing exhibiting a two-piece nut, see components 58 and 60 assembleable from opposite sides of the arcuate bracket and through its associated slot. It is understood that, for purposes of the explanation of FIGS. 5 and 6, the arcuate bracket portion and associated slot can be incorporated into those illustrated in either of the embodiments of FIGS. 1 and 3 and such that a slot 62 defining an inner sidewall passage in extending bracket portion 64 exhibits an end-most and annularly enlarged portion 66 for permitting initial assembly of the two-piece nut. As is further known, the two-piece nut assembly 58 and 60 can exhibit any specified shape and size and is again preferably constructed of a suitable synthetic material, such as a Nylok® material or the like.

The assembleable and combination bushing and nut provides a chuck control feature to the invention and includes the steps of threading the nut portion 58 onto the lead screw 14, which is then slid into the key slot opening, see portion 66. The bushing portion 60 of the nut is then staked against the nut portion 58 to stake the end of the lead screw into operating position, the nut controlling chuck movement in both directions.

Having described our invention, other and additional preferred embodiments will become apparent to those skilled in the art to which it pertains and without deviating from the scope of the appended claims:

We claim:

1. A powered seat assembly for reducing end-play of an associated lead screw interconnecting a pivotally secured seat back to a motor gear box, a motor actuating the lead screw through an input to the motor gear box and in order to pivotally readjust the seat back, said assembly comprising:

a base plate, the seat back pivotally securing to a forward location of said base plate, the motor gear box securing to a rearward location of said base plate;

a bracket secured to an intermediate location of said base plate, a slot defined in an extending portion of said bracket defining a passage therethrough for the lead screw; and a spacer bushing supported upon the lead screw and adhering against a face of said bracket opposite the pivotally secured seat back, said spacer bushing absorbing tensile loading forces applied axially along the lead screw and in a direction towards the seat back in order to prevent movement of the lead screw in and out of the motor gear box.

2. The powered seat assembly as described in claim 1, further comprising said spacer bushing exhibiting a diameter greater than a width associated with said slot, said spacer bushing being constructed of a material different than that associated with said bracket.

3. The powered seat assembly as described in claim 2, said spacer bushing being constructed of a nylon material.

4. The powered seat assembly as described in claim 2, further comprising a threadably engaged retention nut abutting against a facing side of said spacer bushing opposite said bracket.

5. The powered seat assembly as described in claim 2, said spacer bushing exhibiting an arcuate shaped contact surface relative to said bracket and slot.

6. The powered seat assembly as described in claim 2, said spacer bushing further comprising a two-piece nut assembleable from opposite sides of said bracket and through said slot.

7. The powered seat assembly as described in claim 6, said slot defining an inner sidewall passage in said extending bracket portion and which exhibits an end-most and enlarged portion for permitting assembly of said two-piece nut.

8. The powered seat assembly as described in claim 7, said two-piece nut exhibiting a specified shape and size and being constructed of a synthetic material.

9. The powered seat assembly as described in claim 8, said assembleable nut exhibiting a specified shape and size and further comprising a Nylok nut.

10. The powered seat assembly as described in claim 1, further comprising said slotted bracket and a motor gearbox support portion being integrated into a single component secured to said baseplate.

11. The powered seat assembly as described in claim 1, said bracket having a specified shape and size and being constructed of a metal, said spacer bushing exhibiting an arcuate shaped contact surface relative to said bracket and associated slot and being constructed of a plastic based synthetic material.

12. A powered seat assembly for reducing end-play of an associated lead screw interconnecting a pivotally secured seat back to a motor gear box, a motor actuating the lead screw through an input to the motor gear box and in order to pivotally readjust the seat back, said assembly comprising:

a base plate, the seat back pivotally securing to a forward location of said base plate, the motor gear box securing to a rearwardly disposed support portion of said base plate;

a bracket secured to an intermediate location of said base plate, a slot defined in an extending portion of said bracket defining a passage therethrough for the lead screw; and a spacer bushing supported upon the lead screw and adhering against a face of said bracket opposite the pivotally secured seat back, said spacer bushing being constructed of a plasticized synthetic material and exhibiting an arcuate shaped contact surface relative to said bracket and extending slot to absorb tensile loading forces applied axially along the lead screw and in a direction towards the seat back to prevent movement of the lead screw in an out of the motor gear box.

13. A powered seat assembly for reducing end-play of an associated lead screw interconnecting a pivotally secured seat back to a motor gear box, a motor actuating the lead screw through an input to the motor gear box and in order to pivotally readjust the seat back, said assembly comprising:

a base plate, the seat back pivotally securing to a forward location of said base plate, the motor gear box securing to a rearwardly disposed support portion of said base plate;

a component secured to a face of said base plate and comprising a first extending bracket portion proximate an intermediate location of said base plate, a slot defined in said extending portion and defining a passage therethrough for the lead screw, a further extending portion of said component defining a motor gearbox support; and a spacer bushing supported upon the lead screw and adhering against a face of said bracket opposite the pivotally secured seat back, said spacer bushing being constructed of a plasticized synthetic material and exhibiting an arcuate shaped contact surface relative to said bracket and extending slot, a nut threadably engaging against an opposite facing surface of said spacer bushing and so that said bushing absorbs tensile loading forces applied axially along the lead screw and in a direction towards the seat back to prevent movement of the lead screw in and out of the motor gear box.

* * * * *